No. 729,119. PATENTED MAY 26, 1903.
T. H. BENNETT.
SHAFT SUPPORT FOR VEHICLES.
APPLICATION FILED JAN. 29, 1903.

NO MODEL.

WITNESSES

Thomas H. Bennett.
INVENTOR

Attorney

No. 729,119. Patented May 26, 1903.

UNITED STATES PATENT OFFICE.

THOMAS H. BENNETT, OF EL PASO, TEXAS.

SHAFT-SUPPORT FOR VEHICLES.

SPECIFICATION forming part of Letters Patent No. 729,119, dated May 26, 1903.

Application filed January 29, 1903. Serial No. 141,019. (No model.)

*To all whom it may concern:*

Be it known that I, THOMAS H. BENNETT, a citizen of the United States, residing at El Paso, in the county of El Paso and State of Texas, have invented certain new and useful Improvements in Shaft-Supports, of which the following is a specification.

My invention relates to improvements in shaft-supports; and the object of my invention is the provision of a simple, durable, and inexpensive device which can be easily applied and which will hold the shafts of a vehicle in a raised position to protect the shafts and save room and prove practical and useful for the intended purpose.

To attain the desired objects, my invention consists of a shaft-support embodying novel features of construction and combination of parts, substantially as disclosed herein.

Figure 1:
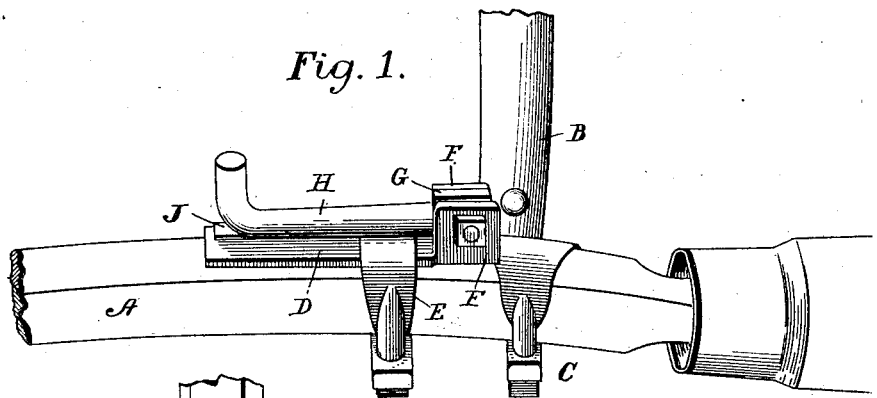
Figure 2:
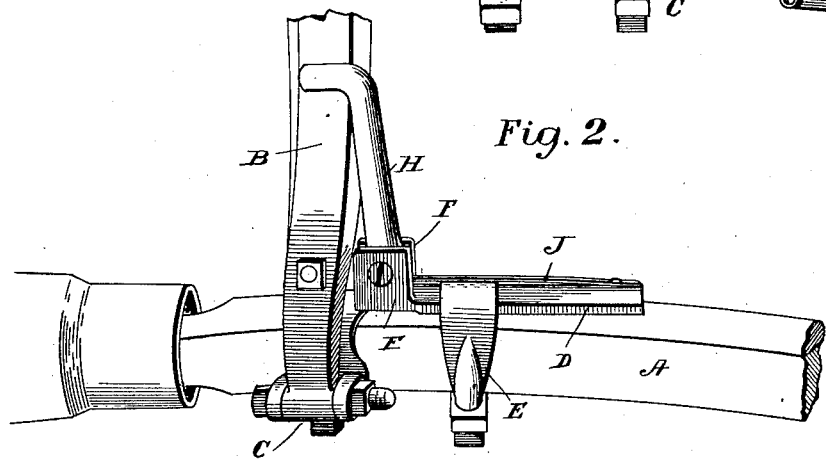
Figure 3:
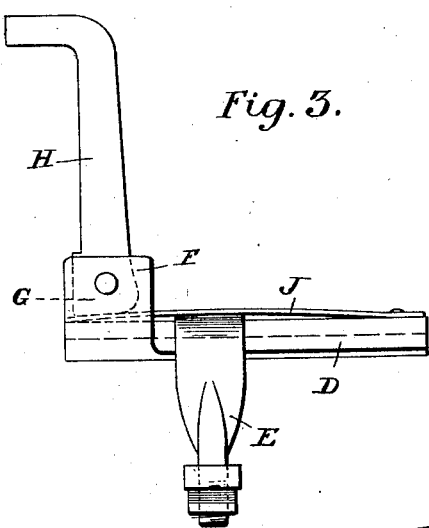

Figure 1 represents a perspective view of a portion of a vehicle with my device in the position it remains when not in use. Fig. 2 represents a similar view with my device in the assumed position when supporting the shafts. Fig. 3 represents a detail view of my device detached.

In the drawings, A designates the axle, and B designates the shafts, of a vehicle connected by a suitable shaft-coupling C, and my device consists of the base-strip D, secured by the clip E to the axle and formed at its outer end with the lugs F, in which is pivoted the head G, carrying the angle-arm H, which head is engaged by the spring J, secured upon the base-strip, and said spring acts to hold the angle-arm when closed or open and also prevents rattling of the same. The angle-arm when the device is used for supporting the shafts is in a vertical position with the horizontal end resting under the shafts when raised. Thus the angle-arm serves to hold the shafts in a raised position.

It is evident that I provide a device which can be applied easily and cheaply, which will not mar or disfigure the vehicle, and which will reliably hold the shafts in a raised position, and thus save considerable space and protect the shafts from damage.

I claim—

1. In combination with an axle and shafts of a vehicle, a movable arm pivoted at its lower end upon the axle and having a bent or angled upper end adapted to engage the shafts and hold them in a raised position.

2. In combination with an axle and shafts of a vehicle, a plate mounted upon the axle, and an angle-arm pivoted upon the plate and adapted to have its upper angled end engage the shafts to hold them in a raised position.

3. In combination with an axle and shafts, a pivoted or hinged angle-arm mounted upon the axle and adapted to have its upper angled end engage and hold the shafts up, and a spring to hold the arm in position and prevent rattling.

In testimony whereof I affix my signature in presence of two witnesses.

THOMAS H. BENNETT.

Witnesses:
E. L. TAYLOR,
E. G. TAYLOR.